Patented Sept. 22, 1931

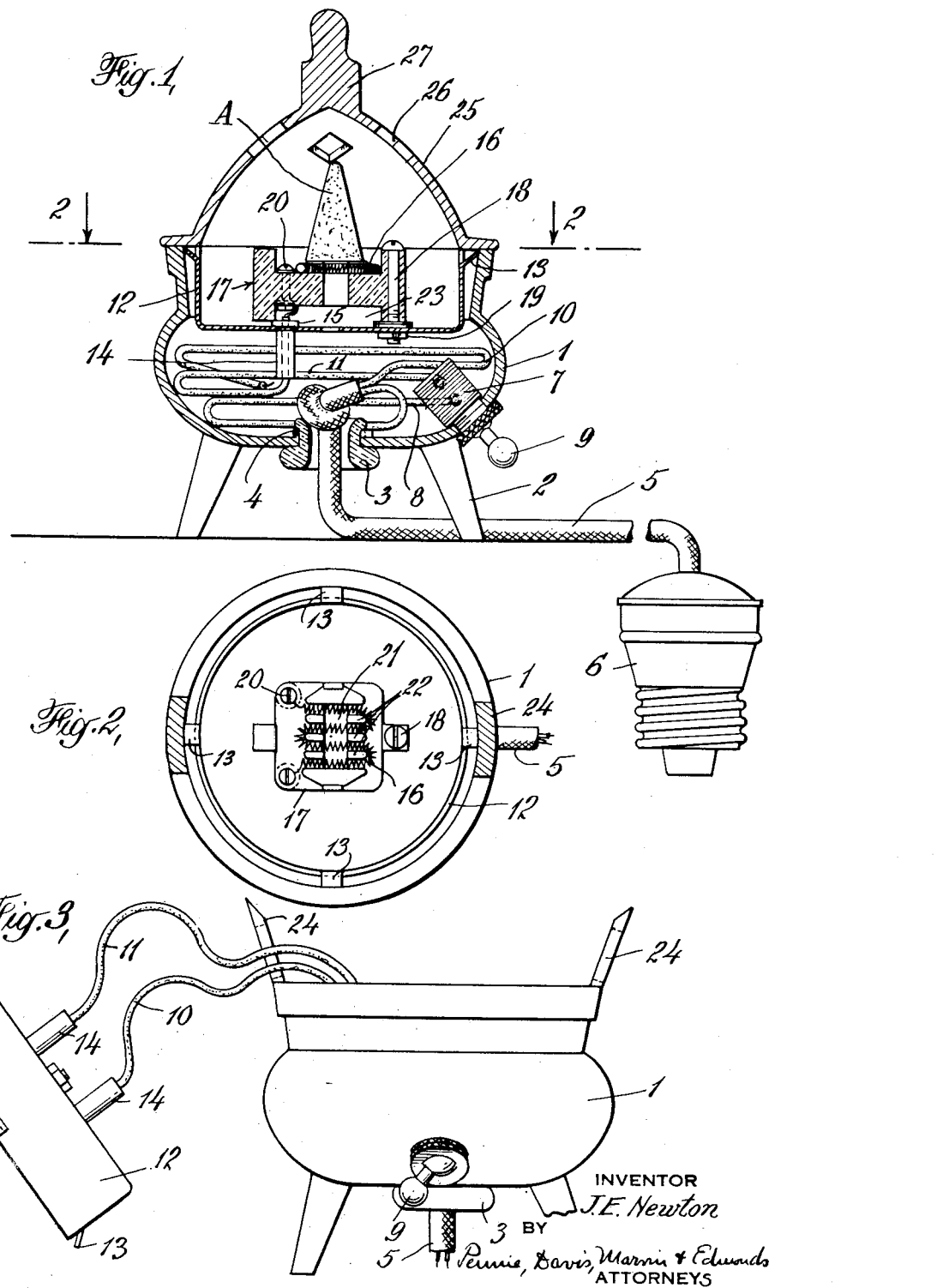

1,824,055

UNITED STATES PATENT OFFICE

JAY EARL NEWTON, OF MADISON, WISCONSIN

INCENSE BURNER

Application filed July 19, 1928. Serial No. 293,821.

This invention relates to incense burners and methods of burning incense.

The practice of burning incense in homes has been followed to some extent, but its popularity has been limited due to the difficulty of igniting the blocks of incense used. In the usual type of incense burner a receptacle is provided to receive the burning block of incense, and the incense, after being lighted, is placed in this receptacle and allowed to burn slowly. The blocks are generally lighted with matches and this results in frequent burning of the fingers of the person lighting the blocks.

In burning incense according to my invention, the block of incense is ignited by means of energy supplied from an electric igniting device arranged within the receptacle in which the incense block is to be burned, and this igniting device may be turned off as soon as the block is lighted and the block allowed to burn in the receptacle in the usual manner.

The invention also includes suitable apparatus for practicing the method consisting of a receptacle having a removable inner casing to permit ashes to be dumped. Within the inner casing the igniting device is supported on a skeleton base of insulating material which permits the ashes formed by the burning of the incense block to fall to the bottom of the casing away from the burning block and igniting device.

In the accompanying drawings I have shown one form of apparatus suitable for use in practicing the process and forming a part of the invention. In the drawings, Fig. 1 is a vertical, sectional view;

Fig. 2 is a horizontal, sectional view on line 2—2 of Fig. 1, and

Fig. 3 is a view of the lower half of the casing with the cover removed.

Referring to the drawings, reference numeral 1 designates a receptacle which may be of any suitable form and is preferably ornamental in shape. The receptacle may be provided with suitable legs 2 to support it on a table or other article of furniture. The bottom of the receptacle is provided with an opening in which a sleeve 3 of insulating material may be mounted and this sleeve may be retained in position by a coil 4 of wire. Lead wires 5 extend through this opening and are provided with a conventional plug 6 on their outer ends adapted to be received in the usual electric outlet socket. One of these wires is connected to a switch 7 as indicated at 8 and this switch is provided with an operating member 9 extending through an opening in the side wall of the casing. The second lead wire 10 and a wire 11 from the opposite side of the switch are coiled in the bottom of the casing as shown in Fig. 1 of the drawings. A removable inner casing 12 is arranged within the receptacle and the side walls of this inner casing may be provided with outwardly extending lugs 13 to retain the inner casing in position and limit its downward movement in the receptacle. The bottom of the inner casing is provided with a pair of openings adapted to receive insulating sleeves 14. These insulating sleeves are provided with collars 15 on their upper ends which engage the bottom of the inner casing and hold the sleeves in position. The wires 10 and 11 extend upwardly through the insulating sleeves 14 and are connected to opposite ends of an igniting device 16 supported on an insulating block 17 in the inner casing. The insulating block is substantially H-shaped in vertical cross section as shown in Fig. 1 of the drawings and a bolt 18 extends through one of the legs of the insulating block and through an opening in the bottom of the inner casing. A nut 19 is arranged on the end of this bolt to retain it in position. Adjacent the opposite end of the cross member a pair of bolts 20 extend vertically through the cross member and are connected to the lead wires. The igniting coil 16 is in turn connected to this bolt.

As shown in Fig. 2 of the drawings the cross member of the insulating block is of greater width than the legs and it is provided with a central vertical opening 21. The upper surface is provided with a plurality of ribs 22 forming parallel grooves in which the igniting device is adapted to be arranged. The central opening 21 communicates with a space 23 beneath the cross member of the insulating block which is adapted to receive ashes formed by the burning of an incense block. The receptacle 1 may be provided with suitable handles 24 and a cover 25 may be arranged on the receptacle. This cover may be of any desired design or configuration to conform with the body portion of the receptacle and it is provided with openings 26 through which the fumes from the burning incense pass into the room. The cover may also be provided with a suitable handle 27.

The operation of the device will be apparent from the foregoing description. When a block of incense is to be burned the cover 25 is removed and the block A placed on the igniting device 16 as shown in Fig. 1 of the drawings. The plug 6 is arranged in an electrical outlet socket and the switch 7 is turned on to energize the igniting device. The energizing of the igniting device in turn ignites the incense block A and the switch 7 may then be turned to its off position to deenergize the igniting device. The incense block A continues to burn after the energizing device has been disconnected from the source of current until it is consumed. The ashes formed by the burning of the incense block pass through the vertical passage 21 in the insulating support 17 to the space 23 in the bottom of the inner casing 12. These ashes may be readily removed by lifting the inner casing from the receptacle and tilting it as shown in Fig. 3 of the drawings. The provision of extra length of wire in the wires 10 and 11 permits the inner casing to be removed in this manner and the ashes disposed of readily.

I claim:

1. An incense burner comprising a receptacle, an inner casing arranged within the receptacle, said inner casing being capable of being removed a limited distance from the receptacle, a substantially H-shaped insulating support arranged within the inner casing, said support being provided with a vertical opening and being spaced beneath said vertical opening from the inner casing to provide a space for the reception of ashes and an electrical igniting device mounted on said insulating support.

2. An incense burner comprising a receptacle, an inner casing arranged within the receptacle, said inner casing being capable of being removed a limited distance from the receptacle, an insulating support mounted in said inner casing, said support comprising a pair of legs, a body portion arranged between said pair of legs of less height than said legs whereby the bottom of the body portion is spaced from the inner casing, the upper surface of said body portion being provided with parallel ribs forming grooves, said body portion being provided with a vertical opening communicating with the space beneath said body portion, and an electrical igniting device arranged in said grooves on the upper surface of said body portion.

3. An incense burner comprising a receptacle, an insulating support mounted therein, said support comprising a central portion spaced from the bottom of the receptacle, said central portion being provided with a vertical opening communicating with the space beneath said central portion, and an electrical igniting device arranged on said insulating support.

In testimony whereof I affix my signature.

JAY EARL NEWTON.